United States Patent [19]

Hart et al.

[11] 4,203,582

[45] May 20, 1980

[54] UNIVERSAL JIG FIXTURE FOR CASTINGS

[75] Inventors: Robert L. Hart, Spartanburg; Frank W. Paul, Seneca, both of S.C.; Wolfgang J. Sauer, Pittsburgh, Pa.

[73] Assignee: The United States of America as represented by the Department of Commerce, Washington, D.C.

[21] Appl. No.: 915,068

[22] Filed: Jun. 12, 1978

[51] Int. Cl.[2] .................................... B23Q 3/08

[52] U.S. Cl. .................................... 269/32; 269/94; 269/296; 269/321 W

[58] Field of Search ............... 425/DIG. 29; 164/412, 164/269; 269/32, 321 A, 321 W, 296–301, 303, 91, 94, 238

[56] References Cited

U.S. PATENT DOCUMENTS

| | | | |
|---|---|---|---|
| 1,973,238 | 9/1934 | Walter | 269/296 |
| 2,421,957 | 6/1947 | Mead | 269/321 A |
| 3,970,296 | 7/1976 | Rameson | 269/32 |

*Primary Examiner*—Robert C. Watson

*Attorney, Agent, or Firm*—Bacon & Thomas

[57] ABSTRACT

A universal jig fixture for tree castings includes longitudinally spaced support blocks mounted on a base structure, the support blocks having top openings with converging, sloping sides that engage similarly shaped sides on the runner of the casting, and hold down clamps for pressing the runner down on the support blocks. The casting is longitudinally located by a stop engaging a sprue cup of the casting or an end stop on the support block. The sprue cup includes a spring finger cup, and the hold down clamp can be fluid actuated. Lateral and vertical location of the casting by the support blocks; longitudinal location of the casting is by the sprue cup stop or the end stop.

5 Claims, 8 Drawing Figures

Fig. 1.
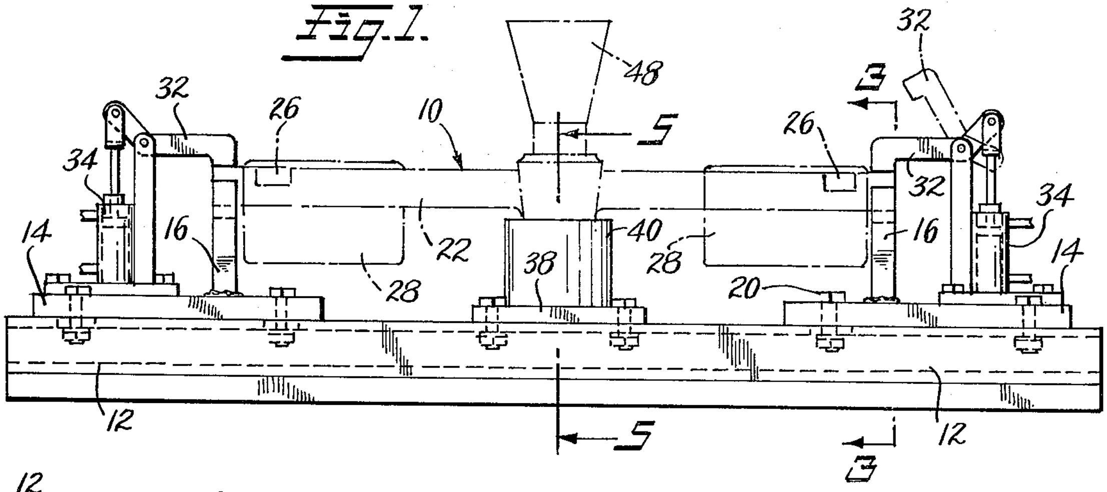
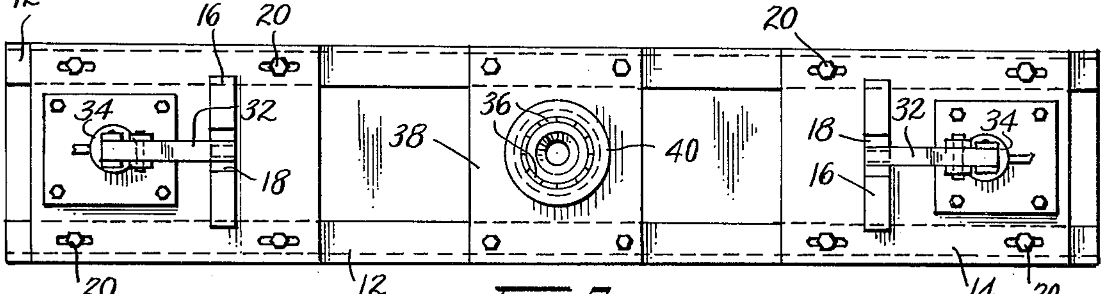
Fig. 2.
Fig. 3.
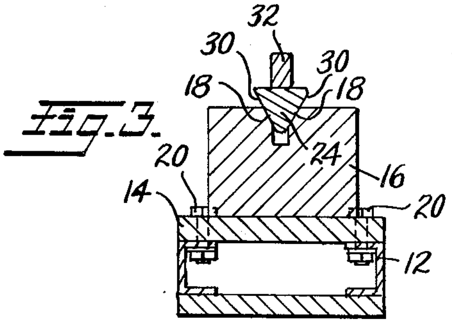
Fig. 5.
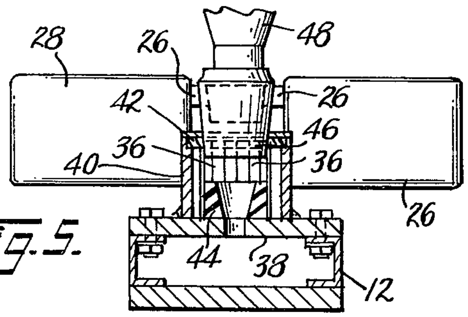
Fig. 4.
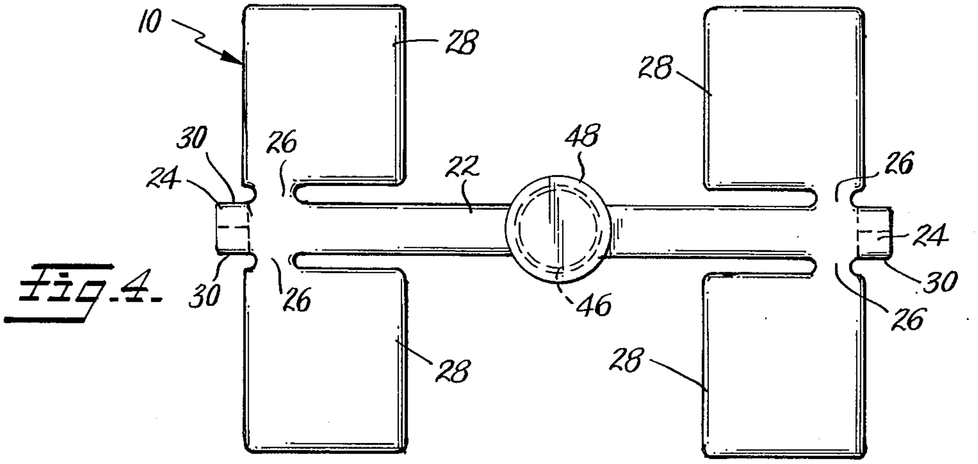

UNIVERSAL JIG FIXTURE FOR CASTINGS

This invention was developed with the participation and support of the National Science Foundation in Washington, D.C.

FIELD OF THE INVENTION

This invention is a jig fixture for locating and supporting metal castings in an accurate manner to enable cleaning or machining operations to be performed in an automated manner on the castings.

BACKGROUND OF THE PRIOR ART

In the prior art, it is known to make a jig for securing a specific casting to permit the castings to be cleaned, cut and otherwise worked upon manually or by manually operated tools. Such fixtures must be specifically designed to hold a specific form of casting and usually constitute simple clamp arrangements arranged to interfere as little as possible with the various cleaning and machining operations to be performed on the castings. Such fixture cannot be used with other castings because of their custom nature.

A problem, therefore, to be overcome is to provide a universal type of fixture that can interface with some portion of the casting that is generally similar on all types of castings, particularly tree or "gate" types of castings. In such castings, a central runner usually connects the castings with the sprue. The runner extends longitudinally of the casting and the elements to be molded are usually symmetrically located with respect to such runner. In the prior art, applicant is not aware that it has previously been contemplated to provide specially shaped surfaces on the runners of various casting configurations, which runner surfaces can interface with a supporting jig for accurately locating and fixing a casting for subsequent mechanical operations to be performed on the castings.

BRIEF SUMMARY OF THE INVENTION

The present invention envisions the providing of special surfaces on runners of steel castings that interface with geometrically similar surfaces on upstanding, longitudinally spaced support blocks provided with a suitable hold down clamp means for urging the surfaces of the runner and the support blocks into engagement with each other. The interengaging surfaces are planar, inwardly and downwardly converging surfaces in the shape of an inverted triangle so that they will engage with each other in wedge fashion in spite of small variations in dimensions between castings.

The support blocks accurately position and locate the runner of the castings in a vertical and lateral sense, and an additional longitudinal stop or indexing means is provided to accurately locate the castings in a longitudinal sense relative to the support blocks or relative to the machine base structure upon which the blocks are located.

The hold down clamp may be actuated by a fluid ram or other suitable means that can be adapted to the particular usage of the fixture that is contemplated.

The longitudinal indexing means for the casting can be in the form of a sprue cup holder that would engage the lower portion of a sprue cup beneath the runner of the casting or can be in the form of an end plate attached to the support blocks. The sprue cup holder is furthermore designed to accommodate minor imperfections in the casting of a sprue cup so that the longitudinal fixation of the casting can be achieved while still accommodating the minor imperfection on the surface of the sprue cup. To this objective, the sprue cup holder comprises an upstanding annular series of spring fingers that can be radially expanded to receive the sprue cup of the casting.

Such a fixture accommodates a wide variety of casting geometries using surfaces provided on a standardized gating system (runners, risers, in gates, sprue cup, sprue) for locating and fixing the position of different castings. Specifically embodied in this invention is a system for utilizing standardized surfaces provided on the end portions of longitudinally extending runners of such castings.

DESCRIPTION OF THE DRAWINGS

FIG. 1 is an elevation view of a jig constructed in accordance with the present invention, showing the casting to be supported by the jig in phantom lines;

FIG. 2 is a plan view of the jig;

FIG. 3 is a view taken along line 3—3 in FIG. 1;

FIG. 4. is a plan view of a typical tree casting to be supported by the jig of the present invention;

FIG. 5 is a detail cross-sectional view taken along line 5—5 in FIG. 1;

DETAILED DESCRIPTION OF SPECIFIC EMBODIMENTS

Figure 6:
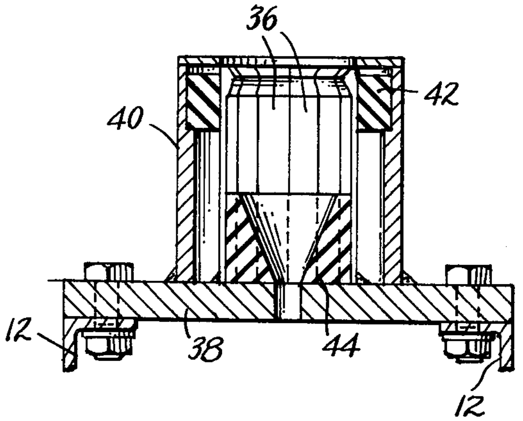
FIG. 6 is an enlarged detailed sectional view of the sprue cup holder of the present invention.

With reference to the drawings, and in particular to FIG. 1, a jig for locating and supporting a tree casting 10 shown in phantom lines in fixed relation to a base structure 12 includes a pair of plate elements 14 longitudinally spaced apart on the base structure 12 and having mounted thereon in rigid fashion a pair of upstanding support blocks 16 that can be seen in end view in FIG. 3. Each support block has a cut out portion in its upper side, the cut out portion constituting a longitudinally extending opening that has a pair of downwardly and inwardly converging planar sides 18 that lie in imaginary planes that converge to a line lying in an imaginary longitudinally extending vertical plane that, in this instance, would lie on the longitudinal axis of a tree casting 10 to be supported by the illustrated jig. Stated in other terms, the sides 18 in support block 16 form two sides of a triangular opening, with the apex of the triangle extending towards the bottom of the support block and lying in the vertical plane including the longitudinal axis of the casting 10.

The plate elements 14, as seen in FIG. 2, can be secured to the base structure 12 by means of suitable fasteners 20 extending through slotted openings in plate elements 14 whereby the latter can be longitudinally adjusted relative to each other and to the base structure.

As seen in FIG. 4, a typical tree casting or "gate" 10 includes a longitudinal runner element 22 having end portions 24, laterally extending gates 26 and a plurality of castings 28. The runner 22 is formed so that at least the end portions 24 have planar sides 30 that are downwardly and inwardly converging. The sides 30 of runner 24 and the sides 18 of the openings in the support blocks correspond in geometry so that a close wedging fit is obtained when the runner end portion 24 is located within the opening in the support block 16. It will be understood that due to the configuration of the runner ends and the openings in the support block, a close fit will be obtained between the runner and the support block opening even though the dimensions of different runners of different castings vary slightly from each other. The wedge fit between the runner 24 and the support block 16 will always insure that the runner is supported accurately along its longitudinal and lateral axes.

Figure 8:
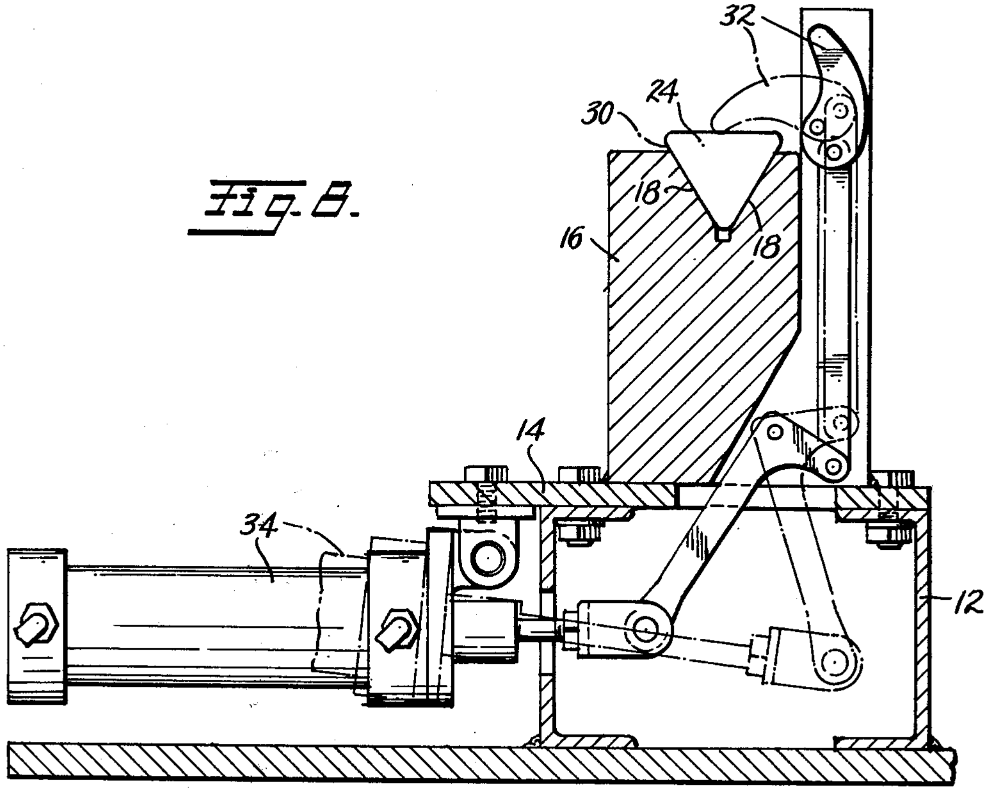
FIG. 8 is a transverse sectional view showing schematically an alternate clamping arrangement.

As shown in FIGS. 1 and 3, a pair of hold down fingers 32 provide a vertical hold down force to the runner of the casting in the area of the support block. The fingers 32 can be actuated by a suitable pneumatic or hydraulic ram 34 secured to plate 14. In the embodiment of FIG. 1, the hydraulic ram is shown mounted atop plate 14. In the alternate embodiment shown in FIG. 8, the ram is shown mounted below the plate. Preferably, the ram is mounted for movement with the plate element 14 so that it will travel with the respective upstanding block 16 with which it is associated. A third embodiment, not shown, utilizes an actuator 34 that is longitudinally aligned with the support structure 12, rather than laterally extending as shown in FIG. 8. Clearly, persons skilled in the art will appreciate that various actuator designs could readily be envisioned for causing hold down fingers 32 to apply a vertical hold down force to the casting in the vicinity of the support block 16.

Figure 7:
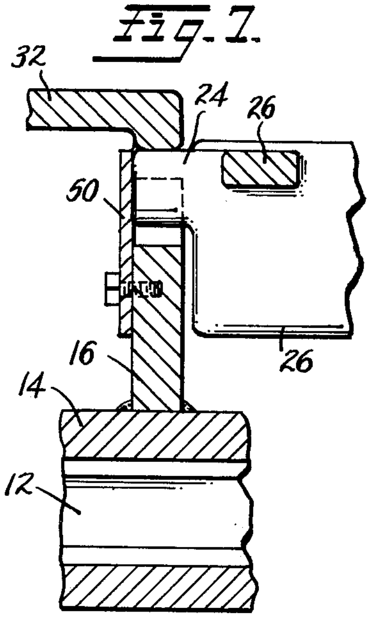
FIG. 7 is a fragmentary enlarged detailed view of an alternate embodiment of the invention.

With the ends 24 of the runner 22 located in the support blocks 16 and securely clamped therein by fingers 32, the casting is accurately and rigidly supported with respect to lateral and vertical axes. It only remains to provide means for accurately locating the casting along its longitudinal axis in order to obtain a jig that will support a series of castings in a precise manner for enabling machine operations to be performed on the casting in a precise, automated manner. Two specific embodiments of longitudinal locating means for the casting are disclosed in the drawings. FIG. 1 shows a sprue cup engaging means for locating the casting along its longitudinal axis, and FIG. 7 shows an end stop secured to each support block for accomplishing the same objective. The sprue cup holder shown in FIG. 1, and illustrated in greater detail in FIGS. 5 and 6, comprising an annular series of upstanding spring finger elements 36 secured to a plate element 38 that is secured to the structure 12. The spring finger elements 36 can be formed by longitudinally cutting a portion of a cylindrical member and welding the base of the cylindrical member to the plate 38. An outer protective sleeve 40 is likewise fixed to the plate 38 and surrounds the spring fingers 36. An elastomer ring 42 is placed about the spring fingers 36 to provide a backing restraint for the spring fingers. The elastomer material 42 is optional in this invention. An additional elastomer internal restraint member 44 may also be optionally provided within the internal base area of the cylinder from which the spring fingers 36 extend. The spring fingers accommodate various surface inperfections in the base of a sprue cup 46 (see FIG. 5) that extends below the sprue 48 of the casting 10. Preferably, the sprue cup 46 is slightly tapered inwardly and downwardly for accommodation in the sprue cup holder, in particular within the spring fingers 36. Thus, when the casting 10 is placed in the jig with the sprue cup 46 within its holder, the casting 10 is longitudinally precisely located relative to the base 12 before the clamping fingers 32 lock the casting in place.

Alternatively, as seen in FIG. 7, end stops 50 may be applied to each support block 16, which would be adjusted relative to base structure 12 for each series of similar castings to accurately locate the castings longitudinally relative to the base structure 12. Various other stop means or indexing means could be provided to accurately locate the casting relative to the base structure 12, but the disclosed embodiments are presently preferred. The jig constructed in accordance with the present invention provides a precise means for locating metal castings in a precise and repeatable manner by means of a very simple structure that can be constructed at minimum cost for use in connection with small run molding operations. The jig can accommodate a wide variety of casting geometries with a minimum set up time. The fixture of castings in such a manner allows the introduction of automated or semi-automated processes and promotes worker safety by eliminating the need for the work piece to be held in position by manipulation. The fixture takes into account the fact that sand castings can only be produced within a predetermined range of tolerances and will require a minimum change to existing molding technology. By providing a fairly precise support surface on the end areas of existing runners, the fixture will permit multiple castings to be repeatedly located with precision relative to a base structure so that additional automated operations can be performed on the casting, such as the cutting of the castings at the gates.

Various modifications and alterations of the basic structure disclosed can be made without altering the scope of the invention. It is envisioned, for example, that the base structure could be associated with the bed of a machine tool; that the plates 14 of the blocks 16 could be operated on precision sliding runners and provided with screw-type advancing means for accurately longitudinally positioning the support blocks 16; that the support blocks 16 could be variously configured to accurately accommodate mating side faces of a runner of a casting; and that the casting itself can be further modified to enable the interlocking relationship between the runner and the support block. The openings in the support block could be differently shaped (different angles) to enable one-way orientation of a casting having similar interface surfaces, and the blocks could be provided with vertical adjustments in case a series of castings included runners with lower surfaces in different planes in the vicinity of the support blocks is to be supported. Thus, it is not intended that the invention be limited to the specific embodiments disclosed, but rather only by the scope of the claims appended hereto.

What is claimed is:

1. A jig for locating and supporting, in fixed relation to a base structure, a tree casting including a central, elongated runner having longitudinally spaced support portions and a downwardly extending sprue cup between said support portions, each of said support portions having a pair of downwardly and inwardly converging planar sides, said jig comprising (a) a base structure;

(b) a pair of longitudinally spaced, upstanding support blocks ridigly attached to the base structure, each support block having a longitudinally extending opening in its upper side, the opening having a pair of downwardly and inwardly converging planar sides corresponding in geometry to the planar sides of a respective runner support portion of a casting to be supported in the jig;

(c) means for applying a generally vertical holddown force to a casting to be mounted in the jig area of the support block; and (d) an upstanding sprue cup holder comprising an annular array of upstanding spring finger elements disposed between said support blocks for engaging the sprue cup of a tree casting thereby to prevent said casting from moving longitudinally relative to said base structure.

2. A jig according to claim 1, including an annular, upstanding protective sleeve disposed about said finger elements in spaced relationship therefrom.

3. A jig according to claim 2, including an elastomer ring around said finger elements.

4. A fig according to claim 1, said downwardly and inwardly converging planar sides of said support block openings lying in planes converging to single lines lying in a common longitudinal vertical plane, and said sprue cup holder having a center axis lying in said longitudinal vertical plane.

5. A jig according to claim 4, including means for applying a generally vertical hold-down force to the runner portion of a tree casting to be mounted in the jig directly over the support blocks of the jig.

* * * * *